Aug. 30, 1966 L. A. MOORE 3,269,436
TREE HARVESTER

Filed July 10, 1963 7 Sheets-Sheet 1

INVENTOR.
LAWRENCE A. MOORE
BY Henry Powers
ATTORNEY

Aug. 30, 1966    L. A. MOORE    3,269,436
TREE HARVESTER
Filed July 10, 1963    7 Sheets-Sheet 2
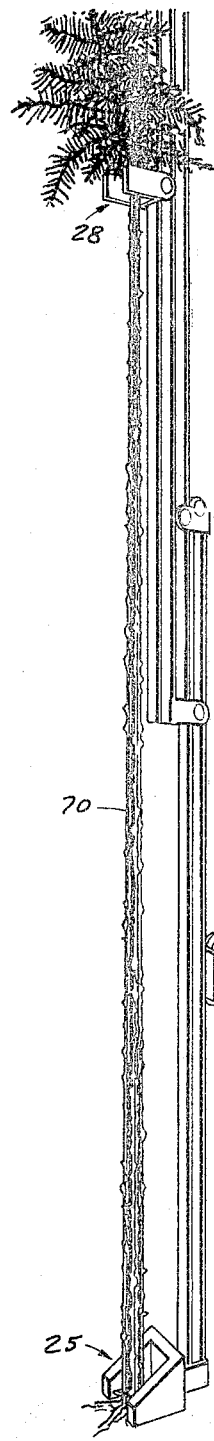
FIG. 2.
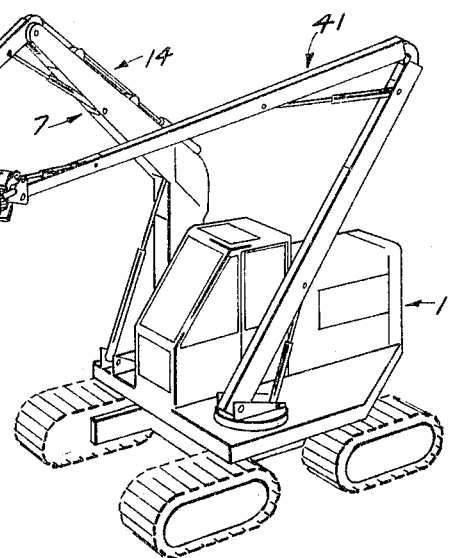
INVENTOR.
LAWRENCE A. MOORE
BY Henry Powers
ATTORNEY Aug. 30, 1966          L. A. MOORE          3,269,436
TREE HARVESTER
Filed July 10, 1963          7 Sheets-Sheet 4
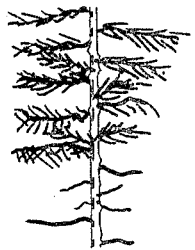
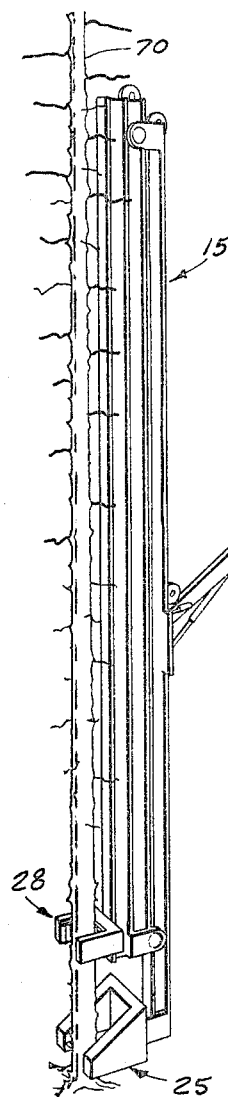
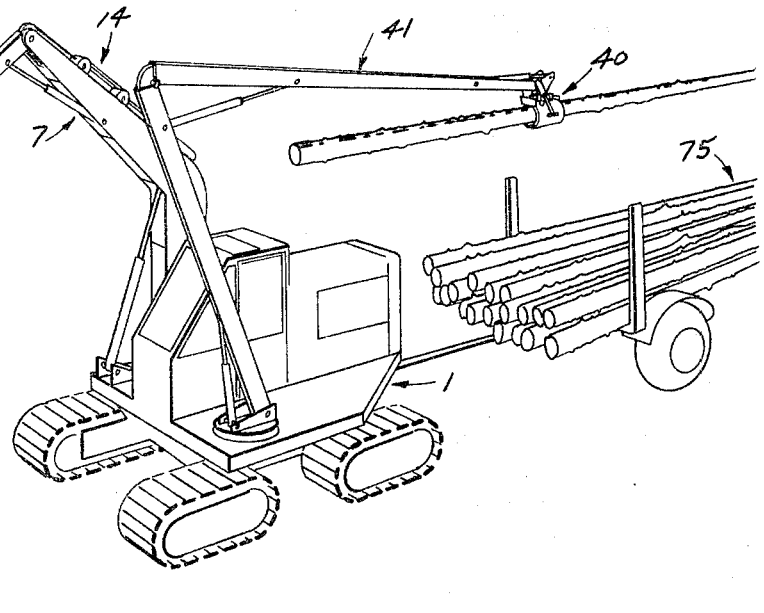
FIG. 4.
INVENTOR.
LAWRENCE A. MOORE
BY
Henry Powers
ATTORNEY

INVENTOR.
LAWRENCE A. MOORE
BY
ATTORNEY

United States Patent Office 3,269,436
Patented August 30, 1966

1

3,269,436
TREE HARVESTER
Lawrence A. Moore, Beloit, Wis., assignor to Beloit
Corporation, a corporation of Wisconsin
Filed July 10, 1963, Ser. No. 294,071
16 Claims. (Cl. 144—3)

This invention relates to forestry operations and more particularly to the harvesting of standing trees.

It is an object of this invention to provide a novel means for mechanizing forestry operations.

It is another object of this invention to provide a novel means adapted to grasp, cut and stack trees at preselected receiving stations without need for intermediate handling.

It is another object of this invention to provide a novel means to delimb standing trees, grasp, cut and stack trees at preselected receiving stations without need for intermediate handling.

A further object of this invention is to provide novel means for the handling of trees which are harvested in forests.

Other objects and advantages of this invention will become more apparent from the following description and drawings in which:

FIGURES 2 through 4 illustrate various stages of forestry operations with the embodiment of FIGURE 1;

Figure 1:
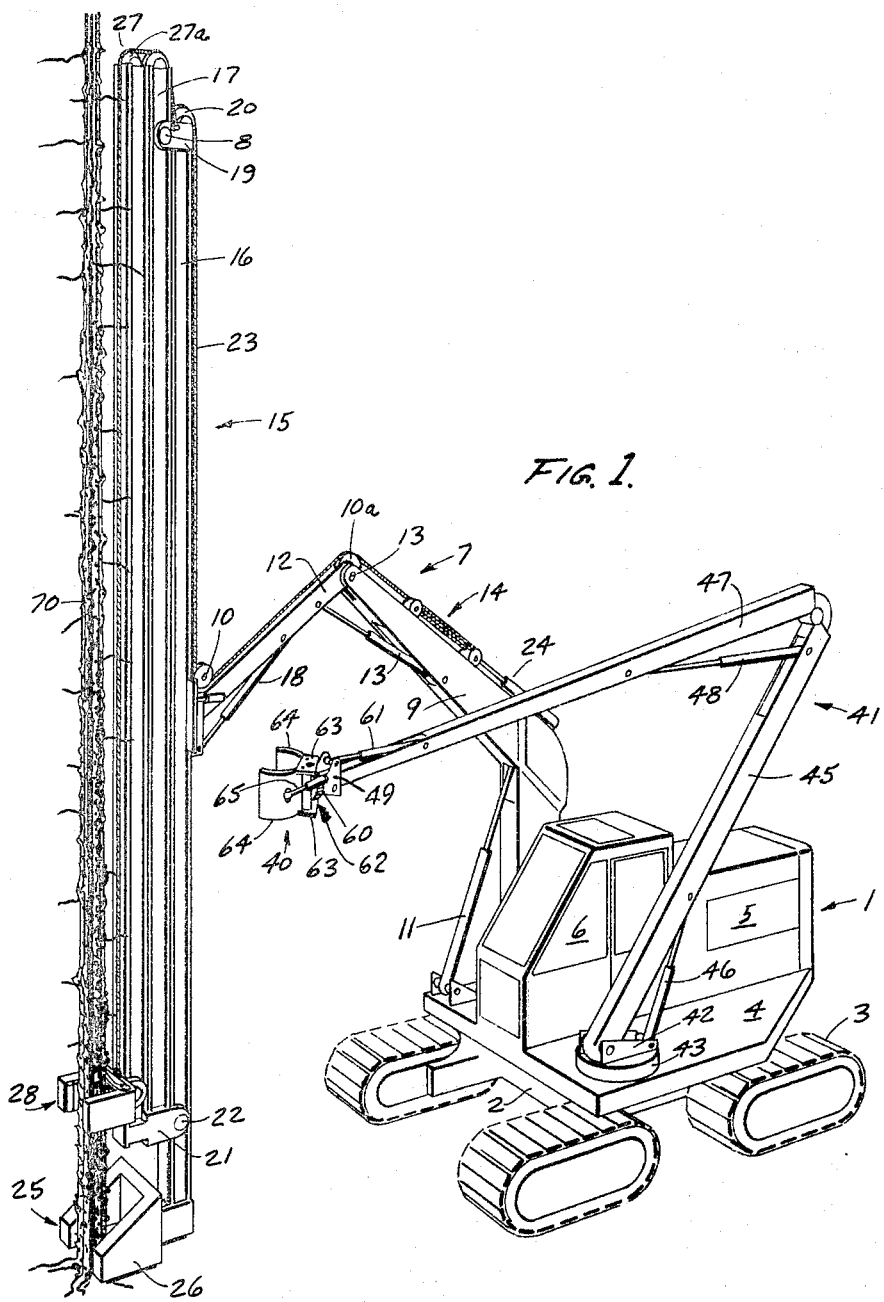
FIGURE 1 is a perspective view illustrating one embodiment of this invention.
Figure 3:
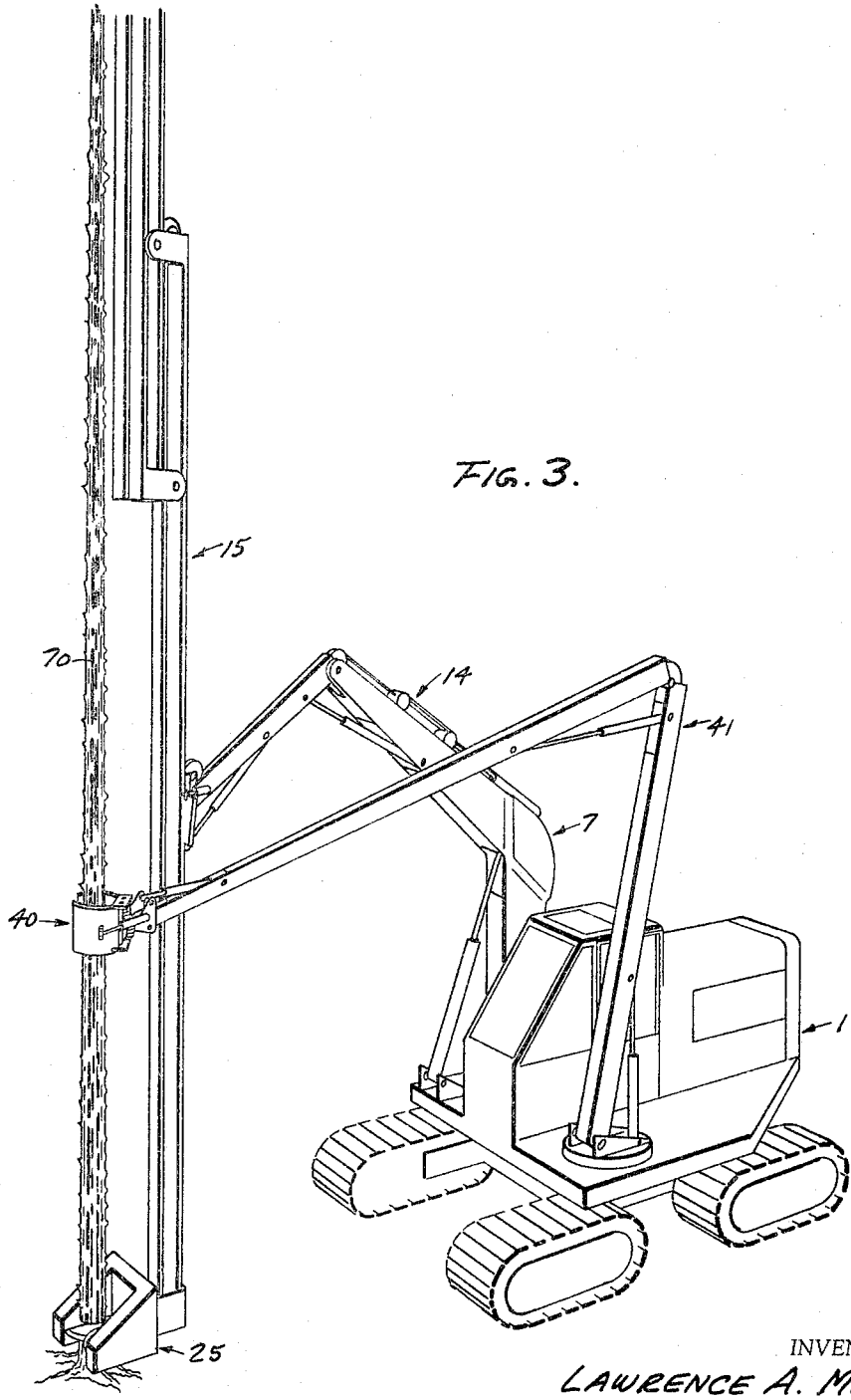

Although the instant invention provides a versatile tree harvesting means adapted for various functions, among these contemplated for this invention is a function complementing that of the "Apparatus for Delimbing and Felling Trees," described and disclosed in U.S. application Serial No. 285,114, filed June 3, 1963, and with which this invention will be described in complementing relationship. Broadly speaking, the invention disclosed in said co-pendng application discloses means for encircling a standing tree with a flexible blade member and than rapidly propelling the blade member up and along the tree with great speed and force so as to impart sufficient momentum to the blade member to cause it to cleave by impact all protruding branches encountered thereby. In addition, this structure includes a top cutting means which tops the delimbed tree, and with additional bottom cutting means for bottom shearing the topped delimbed tree. More specifically, by reference to the drawings, FIGURES 1 through 4 illustrate a mobile vehicle and a carriage denoted generally by the reference number 1 which can assume a variety of mechanical constructions. As the specific form shows, the vehicle includes a chassis or frame sub-structure 2 equipped with endless tracks 3 and surmounting the chassis 2 is a swinghouse assembly 4 which is rotatable about a vertical axis by mounting thereof on a turntable operatively connected to the chassis. The swinghouse assembly also includes an engine 5 providing propelling power for the vehicle as well as hydraulic power for the various cylinders yet to be described. Also located on the swinghouse assembly is an operator's cab 6.

Indicated generally by the reference number 7 is an articulated or reach boom assembly mounted on the swinghouse platform by means of a pair of uprights or standards, not shown. The boom assembly includes a first arm or rear boom section 9 swingably connected to the standards, and the raising or lowering of the boom section 9 is accomplished by means of a hydraulic cylinder-piston assembly 11 pivotally connected between the boom section 9 and the standards.

In addition, as shown in the drawings, the boom assembly 7 also includes a second or front boom section 12 pivotally connected to the rear boom section by means of a pivot 13. Relative movement between the front and the rear boom sections 9 and 12 is effected by means of a hydraulic cylinder-piston assembly 13 pivotally connected to and between the boom sections 9 and 12.

Mounted for pivotal movement at the distal end of the front boom section 12 is a sliding mast assembly 15 comprised of a stationary first mast unit 16 and a traveling second mast unit 17 operatively connected together in longitudinally reciprocating relationship with both of the mast units illustrated here as having an I-beam configuration. Controlled pivotal movement of the mast assembly relative to the boom assembly is effected by means of a hydraulic cylinder and piston assembly 18 operatively connected together between and to the first mast unit 16 and the front boom section 12. At the upper end of the mast unit 16 is a bracket 19 fixedly attached thereto and provided with guide wheels 8 which are engaged between and bear against the flanges of the second mast unit 17. A lower bracket 21 is secured to the second mast unit 17 and is similarly provided with guide wheels 22 which ride between the flanges of the first mast unit 16. As will be appreciated, this inter-connection connects the two mast units together in a manner in which the traveling or second mast unit 17 is constrained to follow a reciprocal path relative to the first mast unit 16 due to the co-action provided by the guide wheels 8 and 22 riding between the flanges of the mast units. In order to effect the raising and lowering of the second mast unit 17 relative to the first mast unit 16, a flexible cable 23 is connected at one end to the lower end of the traveling mast unit 17 and then extended upwardly between the mast units, over a sheave or pulley 20 rotatably mounted at the top of the stationary first unit 16. In addition, the cable 23 is then passed downwardly to another pulley 10 and over an additional sheave or pulley 10a rotatably mounted at the joint of the rear and front boom sections 9 and 12, with the cable then being operatively connected to the multiple sheave block assembly 14 comprised of multiple sheave blocks disposed in co-operating relationship with each other and adapted for effecting speed multiplication in the upward and downward travel of the reciprocating mast units. The cable 23, after extension from the mast assembly to the sheave block assembly, is then passed back and forth between and over the multiple sheave blocks for several loops and then secured or anchored to the rear boom section 9. As illustrated, an extensible hydraulic cylinder-piston assembly 24 is operatively connected between the sheave block assembly 14 and the rear boom section 9. As shown in the drawing, the operative connection of the flexible cable 23, to the traveling mast unit 17 is completed by securement of the distal end of the cable to the traveling mast unit 17 in any convenient place thereon, as for example to the bracket 21 which is affixed to the traveling mast 17.

As will be appreciated, a short travel of the piston of the hydraulic assembly 24 will greatly multiply the travel of the flexible cable 23 so as to effect a swift rise and fall of the traveling second mast unit 17 and its associated mechanisms. It will be noted that the constant pressure applied to the hydraulic cylinder-piston assembly 24 causes the flexible cable 23, through the speed multiplying function of the block assembly 14, to accelerate when pulling the traveling mast unit 17 upwardly from a position of rest, with corresponding and associated acceleration effected in the traveling mast unit 17. Fixedly and angularly mounted to the bottom of the second or traveling mast unit 17 is a tree cutting mechanism 25 of any conventional construction. In one form the tree cutting mechanism may comprise a supporting frame structure 26 secured to the bottom of the stationary first mast unit 16 and which, although not necessary, may be pivotally mounted thereto for angular adjustment to facilitate its positioning in cutting relationship with a standing tree. As shown in the drawings, the frame is formed on a U-shaped configuration defining a cradle for receiving a standing tree therein. The cutting function of the cutting means is accomplished by means of a pair of blades pivotally mounted at each side of the bight of the cradle in co-acting relationship under actuation by the hydraulic pressure means and the like. As indicated above, these cutting means may take other configurations, and for example such as the unit described and disclosed in the aforesaid co-pending application, U.S. Ser. No. 285,114.

Figure 5:
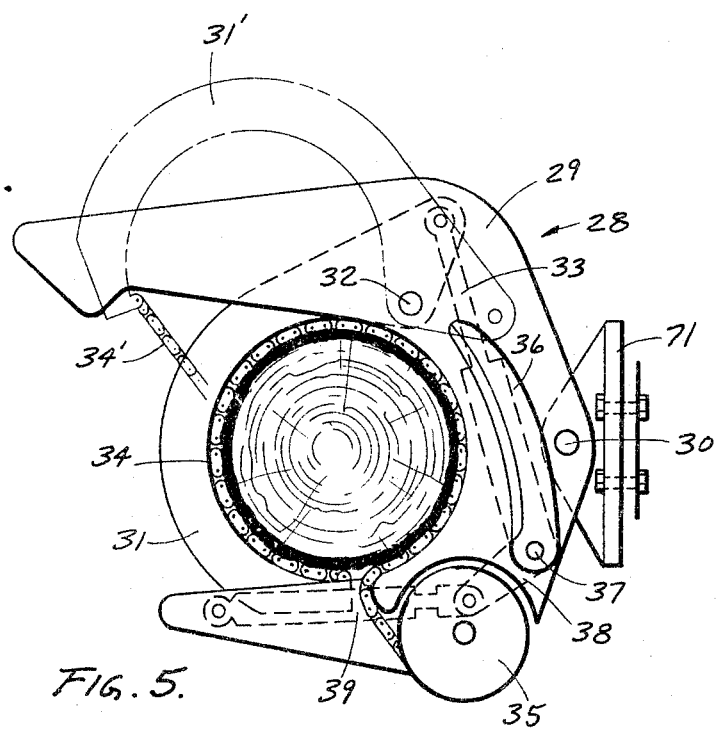
FIGURE 5 is a plan view of a delimbing means adaptable for the preceding embodiment.

In a completely mechanized unit illustrated in the drawing, the structure also includes a mechanism for delimbing protruding branches from a standing tree and which mechanism may take the construction illustrated in the aforesaid co-pending application. Accordingly, the delimbing mechanism 28 includes a U-shaped frame structure 29 (as more particularly shown in FIGURE 5) which may be formed of a spaced plate construction suitably enclosed within a housing as shown in FIGURE 1, with the operative connection of the delimbing mechanism to the traveling mast unit 17 effected by mounting the delimbing mechanism to a bracket 71 provided with suitable tracking mechanism for engagement with and between the flanges of the traveling mast unit 17. This frame structure may be secured to the traveling mast 17 in any suitable manner, as for example it may be pivotally mounted to a bracket 71 about a pivot pin 30. The delimbing structure also includes an encircling arm 31 which is pivotally mounted about a pivot 32 within the frame structure 29. Actuation of the arm is effected by means of a hydraulic cylinder-piston assembly 33 pivotally connected to the frame structure and to an off-set portion of the encircling arm 31. As will be appreciated, when the hydraulic cylinder-piston assembly 33 is in a retracted position, the arm 31 will take the position indicated at $31^1$ by the phantom lines provided in FIGURE 5. Conversely, the extended position of the hydraulic cylinder-piston assembly 33 causes the encircling arm 31 to assume the position shown by the solid lines defining it in FIGURE 5. Also connected at the distal end of the encircling arm 31 is a flexible knife structure 34 which, if desired, may be in the form of a link chain. As shown in the drawings, one end of the chain is secured to the distal end of the arm 31 and the other end of the knife structure is attached at a spool or drum 35 which is biased in any suitable manner, as for example either by hydraulic motor or spring means, for rotation in a counter-clockwise direction so as to constrain the flexible knife structure to be wound on the spool when no force is applied to it to overcome the biasing action provided by the drum 35. Thus, when the encircling arm 31 is in the phantom position shown in FIGURE 5 in the absence of any tree disposed within the opening of the U-shaped frame 29, then the flexible knife structure or chain 34 will assume the phantom position $34^1$ shown in this figure.

Also included in conjunction with the tree delimbing mechanism is a shear 36 which is adapted to top trees when the delimbing mechanism 28 is actuated to the desired position on the tree. Operative connection of the shear 36 is effected by its securement to a shaft 37 which extends downwardly through frame 29 with a lever arm 38 secured to the bottom of the shaft. Actuation of the shear is effected by means of a hydraulic cylinder-piston assembly 39 which is pivotally connected between and to the frame 29 and the lever arm 38.

To effect the movement of the mechanism of the traveling mast unit 17, a cable 27 is attached at one end to the delimbing mechanism and attached upwardly over a sheave or pulley 27a mounted at the top of the traveling mast unit 17 and with the other end of the cable suitably secured to the top of the stationary mast unit 16, as for example to the bracket 19 already secured to this stationary mast 16. Actuation of the hydraulic cylinder-piston assembly 24 causes the cables 23 and 27, due to their speed multiplication connection, to propel or project the delimbing mechanism with terrific speed up the extending mast assembly 16 which imparts to the delimbing mechanism terrific momentum for it to cleave by impact all protruding branches encountered by the flexible knife structure 34 of the delimbing mechanism. Although a specific delimbing mechanism has been indicated, it is to be understood that other units may be adapted for use in conjunction with the invention, as for example such as the unit disclosed in U.S. Letters Patent No. 2,948,311, where and when the rapid function of the specifically described unit is not required.

The tree harvesting mechanism of this application also has, in accordance with this invention, a tree gripping mechanism 40 for manipulation of the delimbed and sheared tree obtained by the functions of the preceding mechanisms above described. The illustrated tree gripping mechanism is mounted to the distal end of an adjustable boom assembly 41 having its other end pivotally mounted to a bracket 42 carried on a supporting base 43 which in turn is rotatably mounted for movement about a vertical axis on a turntable carried on the swinghouse assembly 4.

The adjustable boom assembly comprises an inner or first boom unit 45 having one end pivotally mounted to bracket 42 for angular movement in a vertical plane about a horizontal axis under actuation by a hydraulic cylinder-piston assembly 46 pivotally connected between and to the bracket 42 and the inner boom unit 45. The distal end of the inner boom unit 45 pivotally carries thereon one end of an outer or second boom unit 47 for similar angular movement in a vertical plane about a horizontal axis under actuation of the hydraulic cylinder-piston assembly 48 pivotally connected between and to the two boom units 45 and 47. Carried at the distal end of the outer boom unit 47 is a bell crank 49 which carries on it a rotary swivel mechanism 60 which is attached to the tree gripping mechanism 40. The bell crank adapts the tree gripping mechanism for movement in a vertical plane about a horizontal axis by means of a hydraulic cylinder-piston assembly 61 which is pivotally connected between and to the bell crank 49 and the outer boom unit 47. In similar fashion the rotary swivel mechanism 60 adapts the gripping mechanism for movement in a vertical plane on an axis substantially normal or perpendicular to the axis on which the bell crank pivots. However, as will be understood, that where the secondary rotary movement for the gripping mechanism is not desired, the swivel mechanism may be omitted to restrict the gripping mechanism solely to a movement accorded it by the bell crank 49.

The tree gripping mechanism includes a yoke assembly 62 which can be formed of spaced end plates 63 having pivotally mounted therebetween a pair of co-acting jaws or claws 64 which are movable toward and away from each other by means of a hydraulic cylinder-piston assembly 65 connected between and to the yoke 62 and each of the jaws 64. As will be appreciated, the articulation of the boom assembly 41 enables the operator to position the gripping mechanism in encirclement about a tree which is being processed and to, thereon, supportingly clamp the tree.

In operation, the vehicle 1 is moved into position to enable it, through the reach boom assembly 7, to position the bottom shear mechanism 25 and the delimbing mechanism 28 into encirclement about the standing tree 70 to be processed. As the delimbing mechanism is moved into encircling or embracing relationship with the standing tree 70, the flexible knife structure 34 will be forceably deflected from its phantom outline position in FIGURE 5 into a partially embracing relationship with the tree with the necessary length of chain being played out from the biased spool 35. Thereafter, the operator actuates the hydraulic cylinder-piston assembly 33 to cause the encircling arm 31 to close about the tree embraced within the frame 29 with simultaneous wrapping of the flexible knife structure 34 about the tree. The delimbing mechanism 28 is then propelled up the standing tree 70 by actuating the hydraulic cylinder-piston assembly 24 for separation of the multiple block unit 14 which causes speed multiplication of the cable 23 with accompanying extension of the mast unit 17 on the stationary mast unit 16 for additional speed multiplication which imparts the necessary momentum to the delimbing mechanism to cleave all protruding branches encountered by the delimbing mechanism.

After the delimbing mechanism reaches the desired height, determined by the usable length of the tree, the operator actuates the hydraulic cylinder-piston assembly 39 to cause the top shear blade 36 to rotate in a counter-clockwise direction to top the tree at that point.

Concurrently with the topping operation, the operator may actuate the adjustable boom assembly 41, through its articulation, to position the tree gripping means about the delimbed tree 70 with attendant movement of the jaws 64 toward one another under sufficient pressure to clamp and to support the tree after a subsequent bottom shearing thereof. However, it is to be understood that the clamping of the tree by the gripping mechanism need not necessarily be concurrent with the top shearing operation but may be accomplished either before or after the topping of the tree. With the delimbed tree clamped and supported by the gripping mechanism 40, the operator actuates the blades of the bottom shear mechanism 28 to sever or cut the lower end of the delimbed tree from its stump to thus leave the tree supported solely by the gripping mechanism 40. Thereafter, the operator can actuate the adjustable boom assembly 41 to effect a slightly vertical movement to the tree to lift its butt off the shears and stump, and then cause it to be swung around and moved to a receiving station such as a trailer 75 for example where the gripping means may be pivoted and rotated to dispose the tree to the desired attitude at the receiving station, in which attitude the jaws may be actuated in movement away from each other releasing the tree and thereby dropping it at the desired station. In the meantime, as will be appreciated, during the transport of the bottom sheared and delimbed tree to the receiving station, the delimbing and bottom shear mechanisms are free for positioning about another standing tree to be harvested.

Figure 6:
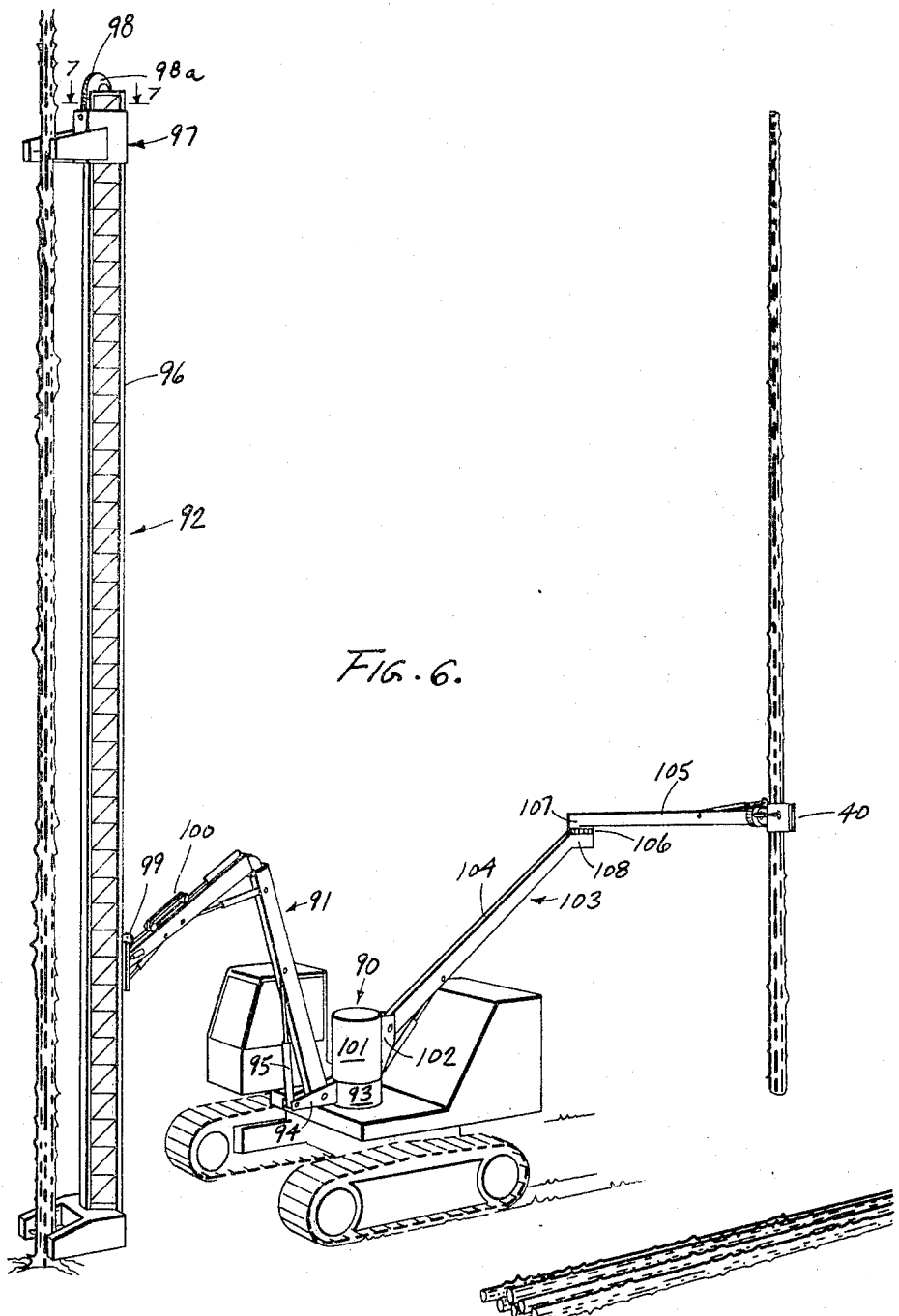
FIGURE 6 is a perspective view of another embodiment of this invention illustrating a modification from the embodiment illustrated in FIGURES 1 through 4.
Figure 7:
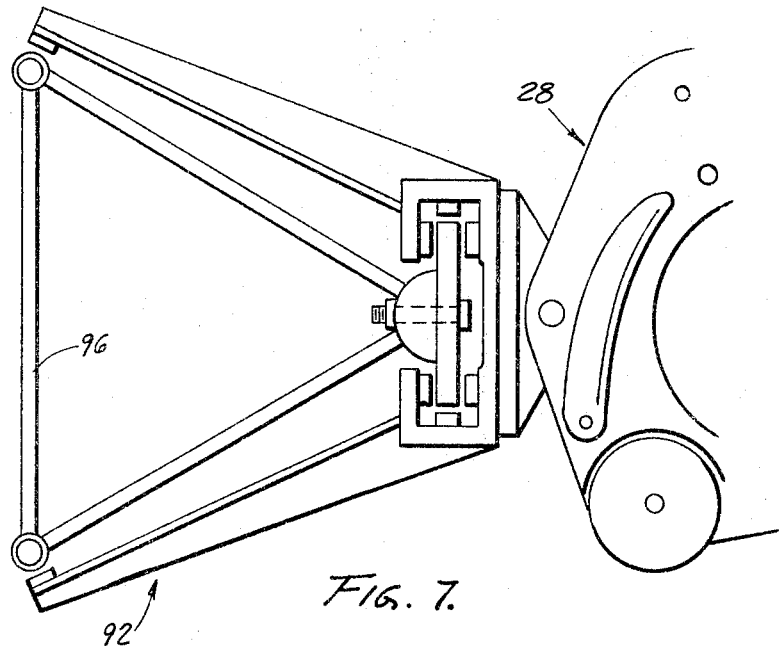
FIGURE 7 is a partial view in section taken along line 7—7 of FIGURE 6.

FIGURE 6 illustrates a modification of the embodiment illustrated above in which the tree processing mechanism and the log gripping means are mounted about a common post or spindle 90. In this modification the articulated reach boom assembly 91 of the tree mechanism 92 is pivotally connected to a cylindrical collar 93 mounted about the post 90, with the collar having at the bottom thereof a radially projecting bracket 94 pivotally carrying thereon a hydraulic cylinder-piston assembly 95 whose distal end is similarly pivotally connected to the rear boom section of the boom assembly 91. In addition, the processing unit of this modification includes a single unitary mast 96 having mounted thereon a delimbing and topping means 97 which may include a means 28 like that of the form discussed above. Actuation of the delimbing mechanism is by means of a cable 98 which is secured at one end to the delimbing means 28, passed over a pulley 98a provided at the top of the mast 96 downwardly to another sheave or pulley 99 and to a multiple block assembly 100 mounted to the front boom section of boom assembly 91. Also mounted about the common post or spindle 90 is a collar 101 provided with a radially extending vertical bracket 102 to which is pivotally mounted the adjustable boom means 103 carrying the gripping means 40. The adjustable boom means may be similar in all respects to that previously described with the mounting between the rear and front units 104 and 105 effected by rotary coupling mechanism 106, comprised of upper and lower units 107 and 108 with a motor means disposed in one of the units for effecting rotary movement of the front boom section 105, about a generally vertical axis in a plane transverse to the rear boom unit 104. Alternately, if desired, the rotary mechanism may be comprised of a hydraulically actuated rack and pinion assembly.

Although the invention has been described with reference to specific materials, embodiments and details, various modifications and changes, within the scope of this invention, will be apparent to one skilled in the art and are contemplated to be embraced within the invention.

What is claimed is:

1. A tree processing apparatus comprising a mobile carriage, a tree cutting means, means supporting said tree cutting means on said carriage for movement into cutting relationship with a standing tree, and means on said carriage for supporting said tree during cutting thereof and for handling said tree thereafter, said supporting and handling means including an adjustable boom means mounted at one of its ends on said carriage separately and independently of said tree cutting means, said boom means having first and second elongated boom sections with one end of said first boom section pivotally mounted to said carriage for movement in a vertical plane about a horizontal first axis, a first pivot means provided at the other end of said first boom section for pivotally mounting one end of said second boom section for movement thereof in a vertical plane about a horizontal second axis, tree gripping means having a pair of coacting jaws, second pivot means mounting said tree gripping means at the other end of said second boom section for movement in a vertical plane about a horizontal third axis, said jaws being mounted for movement toward and away from each other in a generally horizontal direction into and out of clamping engagement with said standing tree, and power means connected to said jaws for actuating them in their clamping action.

2. The apparatus of claim 1 including a base support means rotatably mounted on said carriage for movement in a horizontal plane about a vertical axis, and pivot means mounting to said support means said one end of said first boom section for its said pivoted movement relative to said carriage.

3. A tree processing apparatus comprising a mobile carriage, a tree cutting means, means supporting said tree cutting means on said carriage for movement into cutting relationship with a standing tree, and means on said carriage for supporting said tree during cutting thereof and for handling said tree thereafter, said supporting and handling means including an adjustable boom means mounted at one of its ends on said carriage separately and independently of said tree cutting means, tree gripping means having a pair of coacting jaws, first pivot means mounting said gripping means at the other end of said boom means for movement in a vertical plane about a horizontal first axis, said jaws being mounted on said gripping means for motion toward and away from each other in a generally horizontal direction into and out of clamping engagement with said standing tree, power means connected to said jaws for actuating them in their clamping action, and controllable swivel means operatively connected between said first pivot means and said gripping means adapting said gripping means for rotary movement about an axis transverse to said horizontal first axis.

4. The apparatus of claim 3 wherein said boom means comprises first and second elongated boom sections with one end of said first boom section pivotally mounted to said carriage for movement in a vertical plane about a horizontal second axis, a second pivot means at the other end of said first boom section for pivotally mounting one end of said second section for movement thereof in a vertical plane about a horizontal third axis with the other end of said second section carrying the first said pivot means mounting said gripping means.

5. The apparatus of claim 4 including a base support means rotatably mounted on said carriage for movement in a horizontal plane about a vertical axis, and pivot means mounting to said support means one end of said first boom section for its said pivotal movement relative to said carriage.

6. A tree processing apparatus comprising a mobile carriage, a tree cutting means, means supporting said tree cutting means on said carriage for movement into cutting relationship with a standing tree, and means on said carriage for supporting said tree during cutting thereof and for handling said tree thereafter, said supporting and handling means including an adjustable boom means mounted at one of its ends on said carriage separately and independently of said tree cutting means, tree gripping means having a pair of coacting jaws mounted at the other end of said boom means, said jaws being mounted for movement toward and away from each other in a generally horizontal direction into and out of clamping engagement with said standing tree, and power means connected to said jaws for actuating them in their clamping action, said apparatus further comprising a first pivot means mounting said gripping means at the said other end of said boom means for movement in a vertical plane about a horizontal first axis, and said boom means comprising first and second elongated boom sections with one end of said first boom section pivotally mounted to said carriage for movement in a vertical plane about a horizontal second axis, a controllable swivel means mounted to the other end of said first boom section with said swivel means having an axis of rotation disposed substantially vertically and transverse to said first boom section, mounting means at one end of said second boom section operatively connecting said second boom section to said swivel means for rotary movement thereof about said axis of rotation, said second boom means carrying at its other end said first pivot means for said gripping means.

7. The apparatus of claim 6 including a base support means rotatably mounted on said carriage for movement in a horizontal plane about a vertical axis, and pivot means mounting to said support means said one end of said first boom section for its said pivotal movement relative to said carriage.

8. The apparatus of claim 3 wherein said boom means comprises first and second elongated boom sections with one end of said first boom section pivotally mounted to said carriage for movement in a vertical plane about a horizontal second axis, a controllable swivel means mounted to the other end of said first boom section with said swivel means having its axis of rotation disposed substantially vertically and transverse said first boom section, mounting means at one end of said second boom section pivotally connecting said second boom section to said swivel means for rotary movement thereof of said axis of rotation with said second boom section having its other end carrying the first said pivot means mounting said gripping means.

9. The apparatus of claim 8 including a base support means rotatably mounted on said carriage for movement in a horizontal plane about a vertical axis, and pivot means mounting to said support means said one end of said first boom section for its said pivotal movement relative to said carriage.

10. A tree processing apparatus comprising a mobile carriage, a first adjustable boom means operatively connected at one end of said carriage, an elongated mast operatively connected intermediate its ends adjacent the distal end of said first boom means and disposing said mast in a vertical plane, a tree cutting means, mounting means operatively connecting said cutting means to said mast adjacent the bottom end thereof, said first boom means being adapted to variably position said cutting means in vertical and horizontal displacement relative to said carriage for placement of said cutting means in cutting relationship with a standing tree, a first motor means operatively connected to said cutting means for actuating said cutting means to cut said tree, a second adjustable boom means operatively connected at one end to said carriage, tree gripping means mounted at the other end of said second boom means with said second boom means adapted to variably position said gripping means in vertical and horizontal displacement relative to said carriage for placement of said gripping means for gripping relationship on said tree relative to said cutting means, said gripping means including, a pair of coacting jaws movable toward and away from each other to encircle and supportingly clamp said tree prior to cutting thereof, and a second motor means operatively connected to said gripping means for actuating said jaws.

11. The apparatus of claim 10 including tracking means on and co-extensive with said mast, tree delimbing means slidably mounted on said tracking means, and motor means for reciprocably driving said delimbing means on said tracking means along said mast.

12. The apparatus of claim 11 wherein said mast is extensible with said tracking means co-extending therewithin extension.

13. The apparatus of claim 10 including a second tree cutting means operatively connected with said mast and adapted for the topping of trees adjacent the top of said mast.

14. The apparatus of claim 13 including tracking means on and co-extensive with said mast, tree delimbing means slidably mounted on said tracking means, and motor means for reciprocably driving said delimbing means on said tracking means on said mast.

15. The apparatus of claim 14 wherein said mast is extensible with said tracking means co-extending therewithin in co-extension.

16. A tree processing apparatus comprising a mobile carriage, a tree cutting means, means supporting said tree cutting means on said carriage for movement into cutting relationship with a standing tree, and means separate and independent of said tree cutting means on said carriage for supporting said tree during cutting thereof and for handling said tree thereafter, said supporting and handling means including a first boom section pivotally connected at one end to said carriage for angular adjustment with respect to said carriage, a second boom section pivotally connected at one end to the other end of said first boom section for angular adjustment with respect to said first boom section, tree gripping means mounted directly to the other end of said second boom section so as to be movable in unison with said other end of the second boom section when said first and second boom sections are angularly adjusted to position said gripping means into juxtaposition with the standing tree to be cut, said gripping means having a pair of coacting jaws, and power means counted on said other end of said second boom section and connected to said jaws for actuating said jaws into an open position to accept said standing tree therebetween and into a closed position to clampingly engage said tree.

References Cited by the Examiner

UNITED STATES PATENTS

| | | | |
|---|---|---|---|
| Re. 23,934 | 2/1955 | Rees | 214—147 |
| 1,592,656 | 7/1926 | Corona | 143—43 |
| 2,542,952 | 2/1951 | White | 144—34 |
| 2,814,396 | 11/1957 | Neal | 214—147 |
| 2,833,433 | 5/1958 | Paananen | 214—147 |
| 2,902,069 | 9/1959 | Gentry | 144—3 |
| 2,948,311 | 8/1960 | McCollum | 144—3 |
| 3,029,848 | 4/1962 | Bombardier | 144—3 |
| 3,102,562 | 8/1963 | Horncastle | 144—3 |

FOREIGN PATENTS 621,584    6/1961    Canada.

HAROLD D. WHITEHEAD, *Primary Examiner.*

WILLIAM W. DYER, Jr., *Examiner.*